United States Patent [19]

Sharpe et al.

[11] Patent Number: 4,965,820

[45] Date of Patent: Oct. 23, 1990

[54] CELLULAR TELEPHONE APPARATUS

[75] Inventors: Robin Sharpe, Morden; Peter Hart, Addington, both of United Kingdom; Petrus P. Van de Mortel, Eindhoven, Netherlands

[73] Assignee: U.S. Philips Corporation, New York, N.Y.

[21] Appl. No.: 265,648

[22] Filed: Nov. 1, 1988

[30] Foreign Application Priority Data

Nov. 2, 1987 [GB] United Kingdom ............... 8725626

[51] Int. Cl.$^5$ .......................................... H04M 11/00
[52] U.S. Cl. .................................................. 379/59
[58] Field of Search ............... 379/58, 63, 59; 455/89, 455/73, 33, 54, 56, 186

[56] References Cited

U.S. PATENT DOCUMENTS

| | | | |
|---|---|---|---|
| 4,486,624 | 12/1984 | Puhl et al. | 455/89 |
| 4,618,997 | 10/1986 | Imazeki | 455/76 |
| 4,637,022 | 1/1987 | Burke et al. | 371/37 |
| 4,718,080 | 1/1988 | Serrano | 379/59 |
| 4,829,554 | 5/1989 | Barnes et al. | 379/59 |

OTHER PUBLICATIONS

The Bell System Technical Journal, vol. 58, No. 1, (1/79).

*Primary Examiner*—Jin F. Ng
*Assistant Examiner*—Magdy Shehata
*Attorney, Agent, or Firm*—Anne E. Barschall

[57] ABSTRACT

A cellular telephone apparatus in which several functions such as decoding and encoding data signals, detecting the busy/idle bit and transponding the SAT signal, are carried out by a CMOS data processor (20) which is separate from a CMOS micro-controller (34). The data processor (20) can be operated at a lower clock frequency (1.2 MHz) than the micro-controller (34) which enables current to be saved compared to processing these functions in software using the micro-controller.

12 Claims, 2 Drawing Sheets

CELLULAR TELEPHONE APPARATUS

BACKGROUND OF THE INVENTION

The present invention relates to a cellular telephone apparatus, particularly to a portable subscriber set suitable for use in the Advanced Mobile Phone Service (AMPS) and/or the Total Access Communication System (TACS) which is based on AMPS.

AMPS is disclosed in detail in the Bell System Technical Journal, January 1979 Vol 58, No. 1 and in the interest of brevity only those aspects pertinent to the present invention will be discussed. In order to facilitate an understanding of the present invention a brief description will be given of some of the data communications in the "forward" direction, that is from a base station at a cell site to a subscriber set, and in the "reverse" direction, that is from a subscriber set to a base station.

Each cell in a mobile service area is assigned a batch of duplex channels which is different from the batches allocated to neighbouring cells. The two channels of each duplex pair are separated from each other by 45 MHz. However as the overall number of channels is limited, batches of duplex channels are reused in cells geographically separated from each other so that the risk of signals transmitted by one cell site being mistaken by subscriber sets operating in another distant cell which is allocated the same batch of channels is slight. In order to reduce this risk further a system of supervisory audio tones (SATs) is used which are transmitted by base stations and transponded by the subscriber sets.

Within each cell, one channel of the batch of channels is reserved for setting-up voice channels between subscriber sets and the cell site in which they are currently present. This channel is termed the set-up or access channel and forward and reverse signalling on this channel is exclusively data. Once a voice channel has been set-up data is also transmitted by a "blank and burst" technique in which the voice signal is blanked and data is sent rapidly in a burst. Details of all the possible message formats on the control and voice channels can be derived from for example Bell Systems Technical Journal, January 1979 and the Cellular Mobile Telephone Equipment Specification, July 1982 issued by Advanced Mobile Phone Service Inc. However, four of the more pertinent message formats will be described with reference to FIGS. 1 to 4 of the accompanying drawings.

FIG. 1 shows the forward control channel (FOCC) message stream which consists of three discrete information streams called stream A, stream B and busy/idle stream denoted by the arrows. Each mobile apparatus monitors stream A or stream B and the busy/idle stream.

The message begins with a 10-bit dotting sequence (1010101010) D for bit synchronization, and is followed by an 11-bit word synchronization sequence (11100010010) WS to achieve synchronization with the incoming data. Each word is encoded and contains 40 bits, including parity and is repeated five times. The coding is a linear systematic block code, particularly a (48, 28) BCH code.

For ease of reference the five transmissions of the words A and B have be referenced A1 to A5 and B1 to B5.

FIG. 2 shows the forward voice channel (FVC) data stream, its data rate being 10 kb/sec for AMPS and 8 kb/sec for TACS. The datastream commences with a 101-bit dotting sequence D(101) followed by an 11-bit word synchronization sequence and the first repeat of the word W1. Each word encoded into a (40,28) BCH linear systematic block code is repeated ten more times, referenced W2 to W11; each repeat being preceded by a 37-bit dotting sequence and the 11-bit word synchronizing sequence.

FIG. 3 illustrates the data stream on the reverse control channel (RECC). The data stream is discontinuous and the data rate is 10 kb/sec for AMPS and 8 kb/sec for TACS. The RECC data stream comprises 30 bits of dotting sequence, D, an 11-bit word synchronization sequence, WS, and a 7-bit coded digital color code CDCC (see the Cellular Mobile Telephone equipment Specification referred to above for further information) followed by a 48 bit first word repeated five times (5×RW1), a 48 bit second word repeated five times (5×RW2), a 48 bit third word repeated five times (5×RW3) and so on. The dotting sequence, D, the word synchronization sequence WS and the CDCC constitute a seizure precursor SP. The 48 bit words are encoded in accordance with a BCH (48,36) linear systematic block code.

Finally FIG. 4 shows the reverse voice channel (RVC) data stream which from time to time interrupts analog voice signals. The data stream commences with a 101 bit dotting sequence D(101) followed by an 11-bit word synchronization sequence and the first repeat of a first 48 bit word 1 RW1. Thereafter there are four more repeats of the first word, denoted by 2RW1 to 5RW1, each repeat being preceded by a 37 bit dotting sequence and an 11 bit word synchronization sequence. This data stream is followed by 37 bits of dotting sequence and 11 bits of word synchronisation sequence with five repeats of a second word 1RW2 to 5RW2, and so on.

In a subscriber set, which term includes portable and mobile subscriber sets, it has been customary to digitally process all the data and control information received or to be transmitted as well as provide the internal control information for the subscriber set by means of a microprocessor logic unit. Many program steps are needed in order to be able to implement the required functions in software which in turn means a high clock frequency and a high current consumption. However other sections of the subscriber sets operate at other clock frequencies and in consequence it is necessary to provide several clock generators formed by separate oscillators in each set. A drawback to having several oscillators is that they are expensive, current hungry and are sources of spurious signals.

An object of the present invention is to provide an architecture for a cellular telephone apparatus which mitigates these drawbacks.

SUMMARY OF THE INVENTION

According to the present invention a cellular telephone apparatus comprises a duplex transceiver, a logic unit formed by a data processor and a microcontroller, the data processor being coupled to the transceiver for processing data received by or to be transmitted by the transceiver and the microcontroller being coupled to the data processor for utilizing data produced by the data processor in response to a received data stream and for providing data for transmission, a clock generator for supplying a first clock signal to the microcontroller and means for deriving from the first clock signal a second clock signal which is supplied to the data processor, the second clock signal being of lower frequency than and in synchronism with, the first clock signal to the data processor.

The present invention is based on a recognition of the fact that many of the functions previously carried out in software in the logic unit could be carried out in an architecture comprising a hard-wired data processor and a micro-controller, the data processor operating at a lower clock frequency than the micro-controller which in turn is energized only when (1) decoded data sent in the forward direction is ready to be processed, (2) data is being assembled for encoding in the data processor and (3) control signals are necessary for the operation of the mobile apparatus. Furthermore, by deriving the second clock frequency, the first clock frequency then a second clock generator is not required, saving expense, current and chip area. Also by having synchronized first and second clock signals there will be fewer spurious signals than when separate unsynchronized clock generators are used.

In an embodiment of the apparatus made in accordance with the present invention an oscillator is provided which generates the first clock signal, say 9.6 MHz. The first clock signal is also supplied to a frequency synthesizer for providing a local oscillator signal to the transceiver. The frequency synthesiser includes a divider which produces the second clock signal, say 1.2 MHz, by dividing down the first clock signal. The second clock signal is supplied not only to the data processor but also to an audio processing circuit as well as to another frequency synthesiser for producing the master oscillator frequency of the transmitting section of the transceiver. Dividing down the first clock signal at the frequency synthesizer and distributing the divided down signal as the second clock signal to the dataprocessor and other circuit elements which require this signal also has advantages over the possibility of distributing the first clock signal to all the circuit elements requiring a clock signal and providing a frequency divider in each of those circuit elements which require a lower clock frequency. These advantages are current saving because frequency dividing is a relatively high current consuming process and also a relatively high power would be required to drive the first clock signal to each of the required circuit elements. Another advantage is that the emission of spurious signals is less of a problem at lower frequencies. A further advantage of dividing down the frequency of the first clock signal is that both the first and second clock signals are in synchronism further reducing the possibility of spurious signals.

By hiving off the control functions to the data processor, a control bus within the subscriber set may comprise a serial I²C bus comprising one data line and one clock line. The clock line is operated at a sub-division of the second clock signal which also enables some of the above mentioned advantages to be realized. Additionally a serial I²C bus occupies less board area than a parallel control bus, because there are fewer tracks. Also an integrated circuit to which the I²C bus is connected only requires two pins for the control bus connection thus saving on the number of pins which would otherwise have to be provided in order to effect a connection when using a parallel control bus.

BRIEF DESCRIPTION OF THE DRAWINGS

The present invention will now be described, by way of example, with reference to the accompanying drawings, wherein.

In the drawings the same reference numerals have been used to indicate corresponding features.

DESCRIPTION OF THE PREFERRED EMBODIMENTS

FIGS. 1 to 4 have been described in the preamble.

Figure 1:
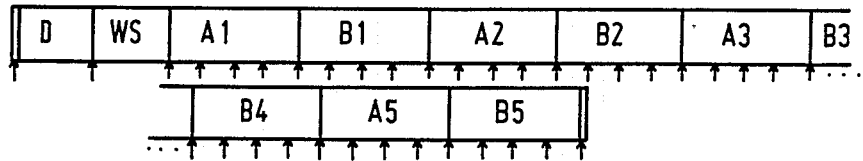
FIG. 1 illustrates the data format for the forward control channel (FOCC) message stream.
Figure 2:
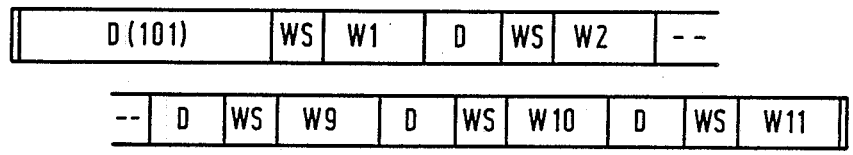
FIG. 2 illustrates the data format for the forward voice channel (FVC)
Figure 3:
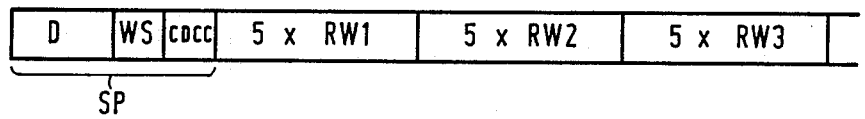
FIG. 3 illustrates the data format for the reverse control channel (RECC)
Figure 4:
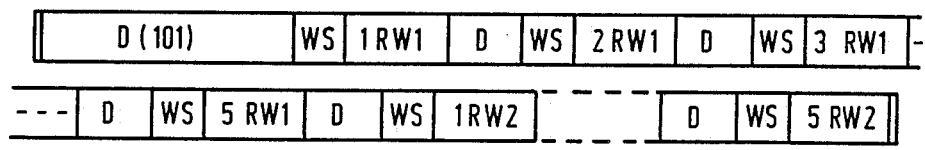
FIG. 4 illustrates the data format for the reverse voice channel (RVC)
Figure 5:
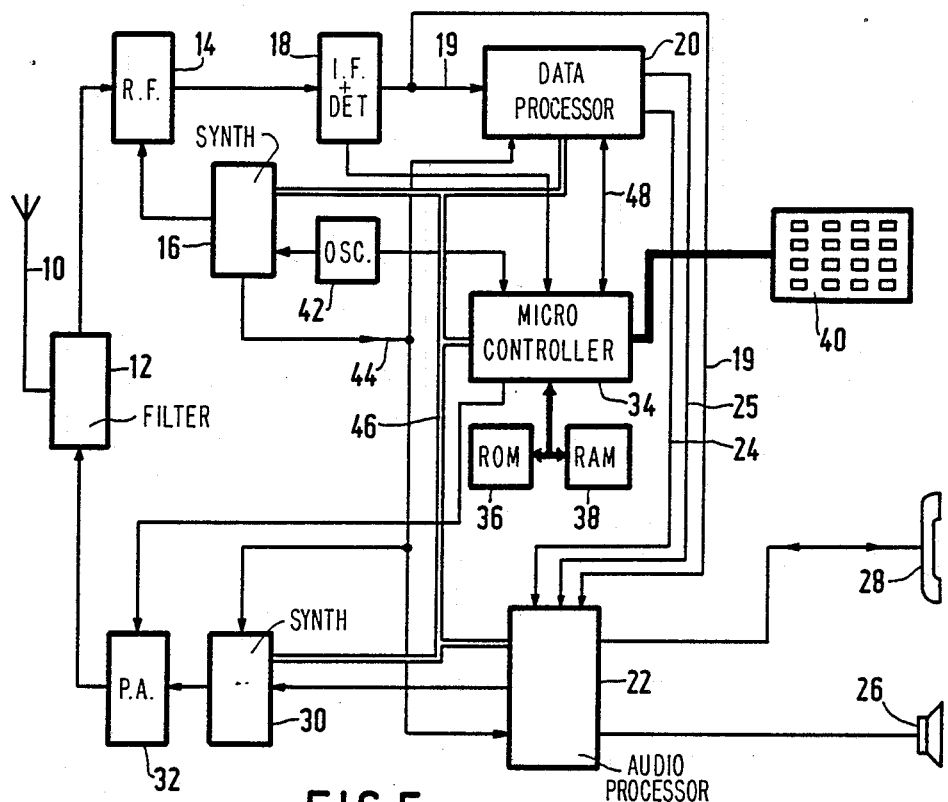
FIG. 5 is a simplified block schematic diagram of a cellular telephone subscriber set made in accordance with the present invention.

The cellular telephone subscriber set shown in FIG. 5 comprises an antenna 10 connected to a duplex filter 12. An r.f. front end section 14 of a receiver is connected to the filter 12. A local oscillator signal is derived from a first frequency synthesizer 16 and is supplied to the r.f. front end section 14. An IF section 18 including a detector is connected to the r.f. section 14. A demodulated output of the IF section 18 is supplied by way of a line 19 to a data processor 20 and to an audio processor 22. The data processor 20 provides a data output when a signal is to be transmitted and a mute output when data is on the voice channel. These outputs are connected to the audio processor 22 by lines 24, 25 respectively. The audio processor 22 provides a alert tone to an loudspeaker 26 and also processes the audio information, for example expanding companded speech, which in the forward direction is supplied to the earpiece of a telephone handset 28. In the reverse direction speech from a microphone in the handset 28 is supplied to the audio processor 22 in which it is for example companded before modulating a reverse carrier signal generated by a second frequency synthesizer 30. The forward and reverse carrier frequencies are a duplex pair having a frequency separation of 45 MHz. The channel spacing is 30 kHz for the AMPS system and 25 kHz for TACS. The modulated reverse signal is supplied to a power amplifier 32 from where it is supplied to the duplex filter 12 for transmission via the antenna 10.

The illustrated apparatus includes a microcontroller 34 together with its associated program read only memory (ROM) 36 and random access memory (RAM) 38 which are directly connected to the microcontroller's address and data busses. A key pad 40 is connected to the microcontroller 34. The microcontroller 34 is clocked at 9.6 MHz generated by an oscillator 42, its output is supplied also to the first frequency synthesiser 16. The first frequency synthesiser 16 includes a frequency divider which divides down the 9.6 MHz clock signal to produce a second clock signal at 1.2 MHz which is synchronised with the first clock signal and which is supplied via a line 44 to the data processor 20, the audio processor 22 and the second frequency synthesiser 30.

A serial I²C control bus 46 operating at 100 kb/sec interconnects the microcontroller 34, the data processor 20, the audio processor 22 and the first and second frequency synthesizers 16 and 30.

A two-way synchronous data link 48 is provided between the data processor 20 and the microcontroller 34.

The data processor 20 and the microcontroller 34 are fabricated in accordance with CMOS technology. It is a feature of CMOS devices that their current consumption is linearly related to the clock frequency of the device. In the apparatus made in accordance with the present invention the data processor 20 handles the mundane tasks associated with the data present in the forward and reverse signals, which tasks can be carried out effectively at the second clock frequency of 1.2 MHz by the data processor being hard wired and not operating in software. The microcontroller 34 operating at the first clock frequency of 9.6 MHz only has to carry out those tasks which are best suited to processing in software, for example recognizing if the address contained in a forward signal is that of the apparatus, and when it is not actually processing data then it can revert to a rest mode in which its current consumption is minimal.

In implementing the subscriber set the IF section 18 comprises an NE 605, the audio processor 22 comprises integrated circuits NE 5750 and NE 5751, the data processor 20 will be available as an integrated circuit UMA 1000, the microcontroller 34 comprises an integrated circuit 80C552 and the frequency synthesizers will be available as integrated circuit UMA 1010.

Figure 6:
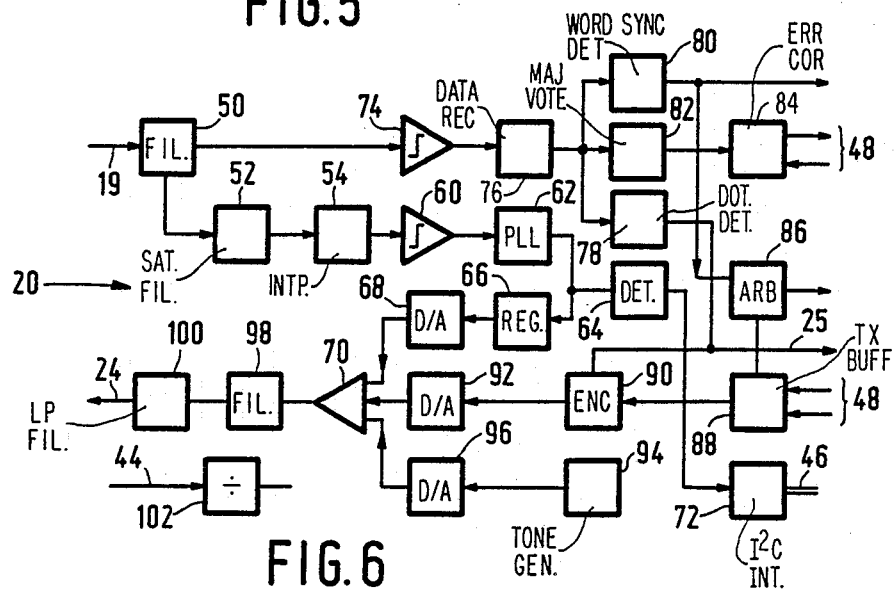
FIG. 6 is a block schematic diagram of a data processor used in the apparatus shown in FIG. 1.

The data processor 20 is shown in block schematic form in FIG. 6 and comprises mixed analogue and digital circuitry. Demodulated analogue data from the IF section 18 (FIGS. 5) is supplied on the line 19 to an anti-alias filter 50. The filter 50 comprises a continuous time distributed RC active low pass filter and is provided to reduce the possibility of any unwanted signals or high frequency noise present on the line 19 from being aliased into the pass band of a supervisory audio tone (SAT) filter 52 which is connected to the filter 50. The SAT filter 52 is a switched capacitor filter which provides bandpass filtering of the SAT signals on the line 19 in order to improve the signal to noise ratio prior to the SAT signal recovery and transponding. The analog SAT signal from the filter 52 is applied to an interpolator 54 which functions to increase the sampling rate at the output of the switched capacitor filter 52. A strobed comparator 60 provides an analog to digital interface for the SAT signal. The comparator 60 acts as a limiting amplifier which converts the filtered, sampled analogue signals into two state sampled digital signals containing only the zero crossing information from the analog signal. The digital signals are applied to a SAT recovery block 62 in which recovery is performed using a digital phase locked loop. The recovered SAT signal is applied to a SAT detector circuit 64 and to a SAT regenerator circuit 66. The detector circuit 64 determines which SAT tone is being transmitted and communicates this information via I²C interface 72 operating at 100 kb/s.

The SAT regeneration circuit 66 generates a digital SAT stream from the recovered SAT stream for transponding back to the base station. The regenerated SAT signal is applied to a gated digital-to-analog (D to A) converter 68 and the analogue SAT signal is combined with other signals in an analogue summer 70.

Another strobed comparator 74 is connected to the anti-alias filter 50. The comparator 74 is similar to the comparator 60 and provides two-state sampled digital signals containing only the zero-crossing information from the analog signal. A data recovery circuit 76 receives wideband Manchester encoded data in sampled and sliced form and performs the functions of clock recovery, Manchester decoding and data regeneration. A dotting detector 78 is connected to the circuit 76 and is used to indicate that a data burst is expected. The dotting detector 78 activates the audio mute line 25 (FIG. 5) to mute the audio processor.

A word synchronization detector 80 is also connected to the data recovery circuit 76 and performs the following functions: frame synchronisation, reverse control channel status and valid serving system determination. The functions are associated solely with the forward control channel. Information detailing the status of the reverse control channel is given by the busy/idle bits, see FIG. 1. The status of the channel is determined by a majority decision on the last three consecutive Busy/Idle bits.

A majority voting circuit 82 is also connected to the data recovery circuit 76. The circuit 82 performs the functions of (1) identifying the position and validity of frames in the received data stream, (2) extracting 5 repeats of each word from a valid frame and (3) performing a bitwise 3-out-of-5 majority decision on the five repeats of the data word.

The cleaned data word is applied to an error correction circuit 84. This circuit performs a number of functions including (1) extraction of a valid message from the cleaned word, (2) correction of up to one error in a word and (3) communication of received data to the microcontroller 34 (FIG. 5) which comprises several lines as shown in FIG. 6.

An arbitration logic circuit 86 is connected to the word synchronisation detector 80. The circuit 86 is responsive to the detection of the busy/idle bits to prevent two subscriber sets from transmitting on the same channel. The arbitration is specified in the AMPS and TACS specifications and accordingly will not be elaborated upon in the present specification.

A transmit buffer 88 is provided and has inputs connected to the synchronous data link 48 for receiving data and clock signals. The buffer 88 which has an output to the arbitration logic circuit 86, holds data to be transmitted on the RECC or RVC. The data from the buffer 88 is applied to the BCH and Manchester encoding circuit 90. This circuit 90 performs the following functions: reception of data from the microcontroller, parity generation, message construction and Manchester generation. The message construction comprises forming the RECC and RVC data streams from the information it receives from the microcontroller. The streams are formed out of four possible field types: dotting, 11 bit synchronisation word, digital colour code and 48 bit code word. The encoded digital data stream is applied to another gated D to A converter 92 whose output is connected to the analogue summer 70.

A signal tone generator, (10 kHz for AMPS and 8 kHz for TACS) which provides a signalling tone stream is applied to a further gated D to A converter 96 whose output is also connected to the analogue summer 70.

The analog summer 70 combines the three sampled digital signals comprising SAT, the encoded digital data and the signal tone to form a composite signal. This composite signal is filtered in an output switched capacitor filter 98 which performs band-limiting of the data processor in accordance with the AMPS or TACS specification. The signal from the output filter is applied to a non-critical continuous time distributed RC active low pass clock filter 100 which is used to remove any high frequency components from the output signal. The filtered signal is supplied by the line 24 to the audio processor 22 (FIG. 5).

The data processor 20 further includes a clock generator 102 to provide internal clock frequencies which are derived from the 1.2 MHz clock signal supplied by the line 44.

Various other configurations of data processors are possible without departing from the scope of the invention as defined in the appended claims.

What is claimed is:

1. A cellular telephone apparatus comprising:
   a duplex transceiver;
   a logic unit comprising a data processor operable at a first clock frequency coupled to the transceiver for processing data received by or to be transmitted by the transceiver and a microcontroller operable at a second clock frequency higher than said first clock frequency coupled to the data processor for utilizing data produced by the data processor and for providing data to the data processor by the transceiver for transmission;
   a clock generator for supplying a first clock signal to the microcontroller; and
   means coupled to said clock generator for generating a second clock signal which is supplied to the data processor, the second clock signal being of lower frequency than, and in synchronism with, the first clock signal.

2. An apparatus as claimed in claim 1, wherein said means coupled to said clock generator comprises a divider for dividing down the first clock signal.

3. An apparatus as claimed in claim 1, further comprising a frequency synthesizer connected to the clock generator and wherein said means coupled to said clock generator comprises a frequency divider in the frequency synthesizer.

4. An apparatus as claimed in claim 1, wherein the data processor and the microcontroller are CMOS devices.

5. An apparatus as claimed in claim 1 wherein the data processor comprises an integrated circuit including analog and digital circuitry.

6. An apparatus as claimed in claim 1 wherein the data processor includes means for detecting digitized dotting and word synchronizing sequences in a received data signal and means for effecting majority voting and error correction of digitized data words comprising the received data signal.

7. An apparatus as claimed in claim 6, wherein the means for detecting dotting and word synchronizing sequences comprises means for determining the status of a busy/idle bit in the received data signal.

8. An apparatus as claimed in claim 1, wherein the data processor comprises means for BCH encoding data words supplied by the microcontroller for onward transmission by the duplex transceiver.

9. An apparatus as claimed in claim 1, wherein the data processor comprises means for determining and transponding a supervisory audio tone signal.

10. An apparatus as claimed in any one of claims 1 to 9, further comprising an audio processor, said audio processor having a clock input connected to said means for supplying the second clock signal.

11. An apparatus as claimed in claim 10, wherein the data processor has means for providing a mute function to the audio processor in response to control data being transmitted on a voice channel.

12. An apparatus as claimed in claim 10, further comprising an I²C control bus interconnecting at least the data processor and the microcontroller.

* * * * *